United States Patent [19]

Lazure

[11] Patent Number: 5,076,101
[45] Date of Patent: Dec. 31, 1991

[54] LIQUID LEVEL MEASUREMENT SYSTEM FOR TANKS

[75] Inventor: Gary P. Lazure, Airdrie, Canada

[73] Assignee: Federal Industries Group Inc.

[21] Appl. No.: 631,453

[22] Filed: Dec. 21, 1990

[51] Int. Cl.$^5$ .................. G01F 23/28; G01F 23/56; G01F 23/30
[52] U.S. Cl. .................. 73/290 V; 73/319; 73/DIG. 5; 367/908; 367/107; 181/124; 181/402
[58] Field of Search .................. 73/290 V, 319, 305, 73/DIG. 5; 367/908, 87, 107; 181/123, 124, 402

[56] References Cited

U.S. PATENT DOCUMENTS

| | | | |
|---|---|---|---|
| 2,934,953 | 5/1960 | Anderson | 73/319 |
| 3,024,659 | 3/1962 | White | 73/319 |
| 3,372,592 | 3/1968 | Gravert | 73/290 V |
| 3,992,941 | 11/1976 | McGoldrick | 73/319 |
| 4,158,964 | 6/1979 | McCrea et al. | 73/290 V |
| 4,305,283 | 12/1981 | Redding | 73/290 V |
| 4,337,656 | 7/1982 | Rapp | 73/290 V |
| 4,589,282 | 5/1986 | Dumery | 73/313 |
| 4,596,144 | 6/1986 | Panton et al. | 73/290 V |
| 4,839,590 | 6/1989 | Koski et al. | 73/290 V |
| 4,924,703 | 5/1990 | White et al. | 73/DIG. 5 |

FOREIGN PATENT DOCUMENTS

| | | | |
|---|---|---|---|
| 1139660 | 11/1962 | Fed. Rep. of Germany | 73/DIG. 5 |
| 0051997 | 11/1966 | Fed. Rep. of Germany | 73/DIG. 5 |
| 0003226 | 1/1988 | Japan | 73/305 |
| 0620828 | 8/1978 | U.S.S.R. | 73/290 V |
| 1186952 | 10/1985 | U.S.S.R. | 73/305 |
| 1078270 | 8/1967 | United Kingdom | 73/319 |

*Primary Examiner*—William A. Cuchlinski, Jr.
*Assistant Examiner*—Diego F. F. Gutierrez
*Attorney, Agent, or Firm*—Ridout & Maybee

[57] ABSTRACT

A system for sensing the level of contents in a container is disclosed. A tubular member is vertically disposed in the container and sealed from the contents of the container. A marker located in the tubular member and generating a peripheral polarized magnetic field, is levitated at the height of float means located around the tubular member buoyed on the contents of the container and generating a polarized magnetic field within the tubular member of like polarity beneath the polarized magnetic field of the marker. A depth transducer located at one end of the tubular member forms part of a pulse-echo ranging system which calculates ranges on the basis of a time lag between emission of an ultrasonic signal by the depth transducer and receipt of at least one return echo signal from the marker in order to determine the depth of the marker in the tubular member, and indirectly, the level of contents in the container.

18 Claims, 4 Drawing Sheets

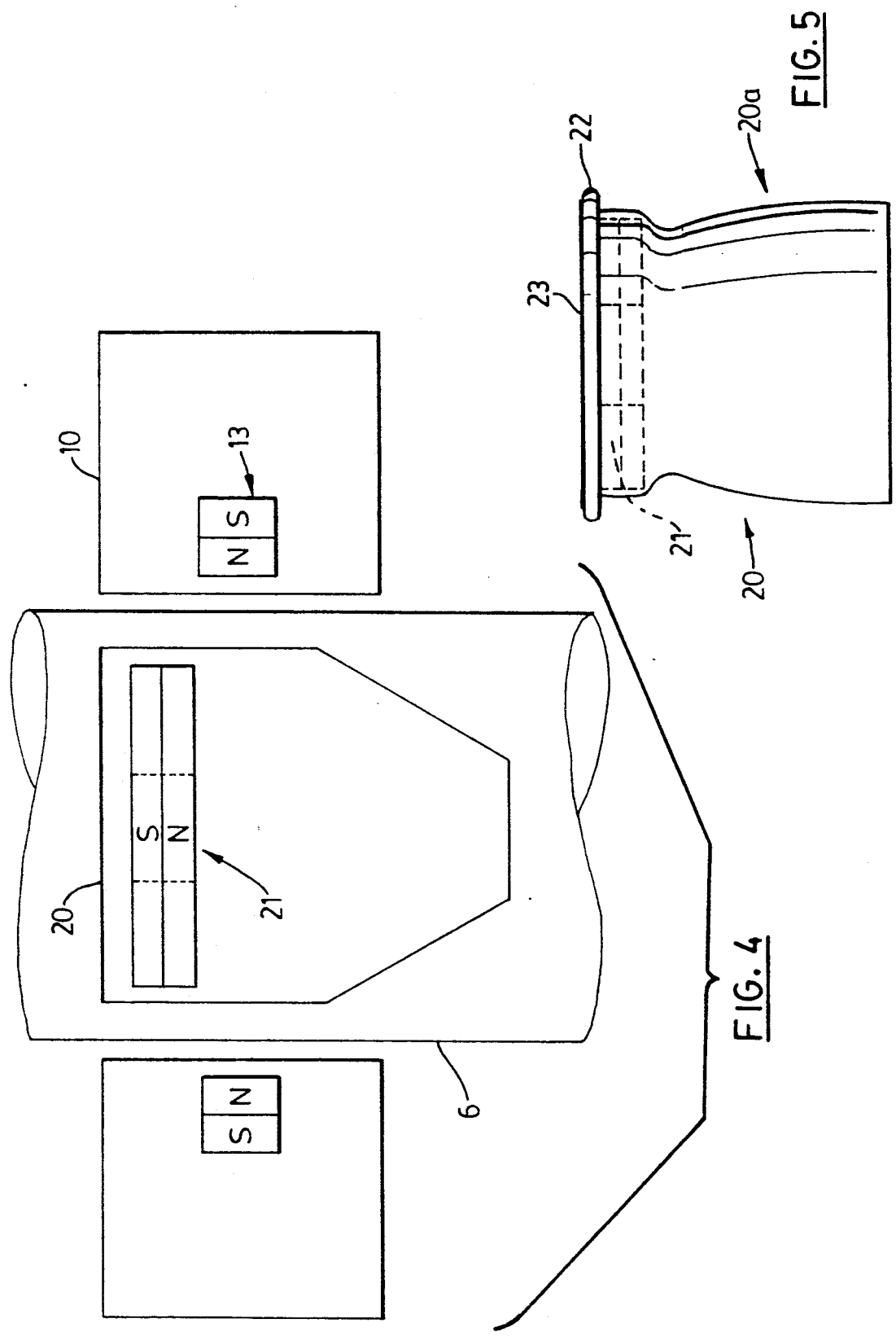

LIQUID LEVEL MEASUREMENT SYSTEM FOR TANKS

BACKGROUND OF THE INVENTION

1. Field of the Invention

This invention relates generally to devices for measuring the level of liquids in containers, and particularly to a float based measuring system for the accurate determination of changing levels of the liquid contents of a container.

2. Description of the Related Art

One of the best known techniques for determining the level of liquid in a container makes use of a float supported by the liquid, the level of the float being determined by means of a suitable transducer which converts vertical movement of the float into signals which can be displayed remotely or utilized for control purposes.

According to the nature of the liquid whose level is being monitored, which may be flammable, corrosive or have other undesirable properties, or produce vapours or residues with such properties, it may be necessary either to protect the transducer from contact with the liquid or vapour, or in the case of flammable or explosive vapours and electrical transducers, to isolate the vapours from the transducer.

Ultrasonic pulse-echo ranging systems have also been widely utilized for determining the level of liquids and solids in tanks, silos, channels and other containers. Examples of such systems are described in U.S. Pat. Nos. 4,596,144 (Panton et al), 4,831,565 (Woodward) and 4,890,266 (Woodward). A problem when using such equipment in sealed containers, containers containing volatile materials, or containers subject to substantial temperature variation, is that the speed of sound varies markedly both with temperature and according to the composition of the atmosphere between the ultrasonic transducer and the liquid level being measured. Furthermore, the high electrical voltages required to energize the transducer can provide problems in meeting safety requirements, especially where highly flammable vapours emitted from the contents of the tank are involved.

In order to address the above problems, various techniques have been developed for indirectly sensing the position of a float in a container. Such techniques generally utilize an annular float surrounding a vertically extending waveguide element. Wave energy is transmitted from one end of the element and reflected at the position of the float back to a receiver so that its transit time can be utilized to determine the position of the float indirectly. Examples of such arrangements are to be found in U.S. Pat. Nos. 3,372,592 (Gravert); 4,158,964 (McCrea et al); 4,305,283 (Redding); and 4,839,590 (Koski et al).

In U.S. Pat. No. 4,589,282, the annular float contains magnets, and surrounds a vertical tube containing a vertical array of Hall-effect sensors. Despite the "vernier" feature described in the patent, a very large number of sensors is required, and the electronic portion of the device is necessarily complex.

In U.S. Pat. No. 4,337,656 (Rapp), indirect level measurements are obtained by providing a float on the surface of the contents of the tank which surrounds a vertical tube inserted into the contents of the container but isolated from its contents. The float contains magnets supporting a follower which is located inside the tube and which is attracted by the magnets. Transducers located at each end of the tube act as transceivers for acoustic signals which are reflected by a target formed by the follower. By measuring the transit time of the signals the level of the target, and indirectly, the level of the float on the surface of the contents of the container, can be calculated.

However, it has been found that the target may not move freely inside the sealed container, especially where there are aberrations in the side wall of the tube, such as welded joints, and may therefore not provide an accurate reading of the level of contents in the container at all times.

It is therefore an object of the present invention to provide an indirect measurement system of the above general type, in which the target can move more freely throughout the length of the tube container, in order to yield more accurate level readings.

SUMMARY OF THE INVENTION

According to the invention, a system is provided for indirectly sensing the level of contents in a container, consisting of a tubular member with top and bottom ends, vertically disposed in the container and sealed from the contents of the container, a depth transducer for transmitting and receiving signals located at one end of the tubular member, and a levitating marker located in the tubular member in signal reflecting relationship with the depth transducer which can sense the depth of the marker in the tubular member. The marker generates a peripheral polarized magnetic field which is of like polarity to a peripheral polarized magnetic field generated, within the tubular member and beneath the field generated by the marker, by a float means surrounding the tubular member and buoyantly supported on the contents in the container. The marker is thus levitated by the repulsive magnetic fields. Means are also provided to maintain the buoy in stable equilibrium within the tubular member, such as adding an axial skirt to the buoy.

Preferably, the depth transducer is adapted to emit ultrasonic signals into the tubular member and to receive return echo signals. The marker is provided with a target having a reflective surface facing the depth transducer for reflecting or echoing at least some of the signals back to the depth transducer. In one embodiment of the invention, the reflective surface of the target is apertured, permitting signals from the depth transducer to reflect off the opposite end of the tubular member, either directly back to the depth transducer or indirectly back to the transducer having first reflected between the target and opposite end of the tubular member.

Preferably, the depth transducer forms part of an echo-ranging system which calculates ranges on the basis of the time lag between emission of a signal by the depth transducer and receipt of at least one return echo signal by the transducer.

BRIEF DESCRIPTION OF THE DRAWINGS

FIGS. 4 is a schematic side view showing an arrangement of magnets between the float and marker, according to the invention.

FIG. 5 is a side view of one configuration of the marker.

DETAILED DESCRIPTION OF THE PREFERRED EMBODIMENTS

Figure 1:
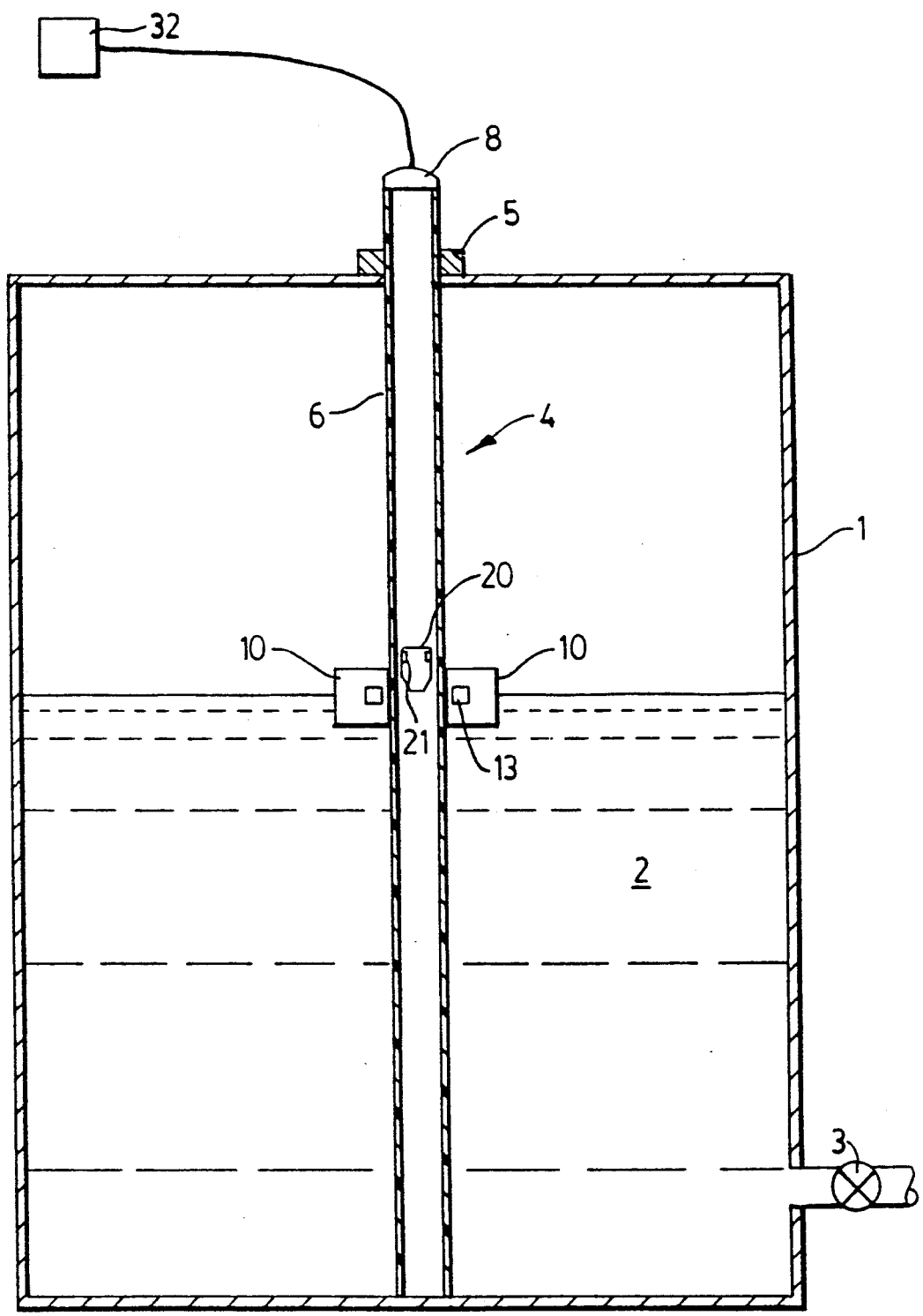
FIG. 1 is a schematic view of a sounding system, according to the invention, located in a tank containing fluid.

As shown in FIG. 1, the present invention is directed to a measuring device intended to be used in a tank 1 or other container for holding fluid 2 or other contents. The tank 1 is provided with an egress 3 for the contents 2 of the tank, which may include a pump.

In order to measure the contents 2 of the tank 1, a liquid measuring system 4 according to the invention consists of a tubular member 6, which is sealed against the contents of the container. The material composition of the tubular member 6 will, to a large extent, be determined by the composition of the container contents. For many applications, use of a polyvinyl chloride tubing, with a threaded cap providing the seal, may be appropriate. More critical applications may require the use of stainless steel tubing. Whilst the use of ferrous material for the tube is not excluded, its thickness and magnetic properties should not be such as to interfere substantially with the action of the magnets described below.

The liquid measuring system 4 may be removeably placed in the tank, or may be permanently affixed in the tank. Where the measuring system 4 is removable from the tank 1, laterally extending flanges 5 may be used to grip the sides of the tank 1 and hold the system 4 in place in the tank 1 when it is in use.

Where the tubular member 6 is to be permanently mounted in the container, proper securement will require use of like material composition, that is, a ferrous tubular member 6 can be welded into a container 1 with ferrous flooring as shown in FIG. 1.

Figure 2:
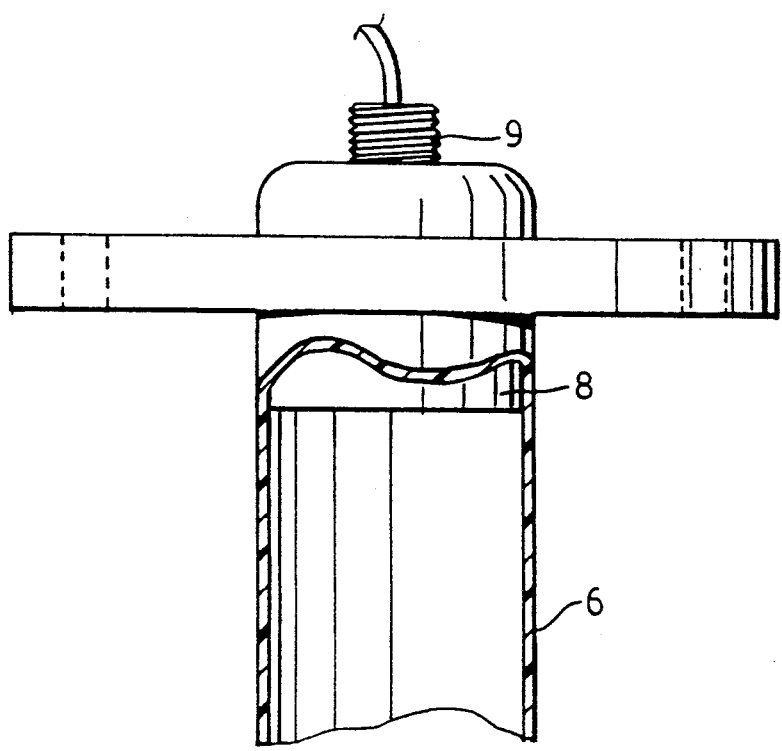
FIG. 2 is an interrupted side view of the level measurement system, according to the invention, with the target and float shown in side cross-section.
Figure 2:
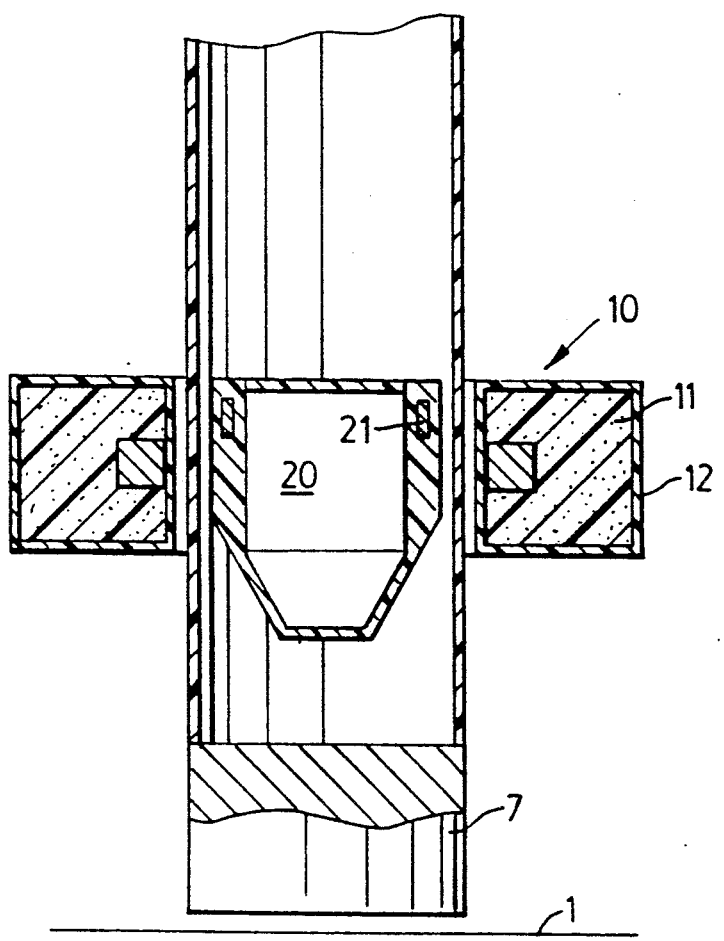

To maximize the measurement range, the bottom of the tubular member 6 may extend to the bottom of tank 1 below the outlet 3 whose level will usually represent the lowest level to be measured. Where the tubular member 6 is not permanently affixed, and especially if constructed of lightweight or flexible PVC, it preferably has a weight 7 at the bottom, as shown in FIG. 2, in order to assist installation and to provide a straight pathway between the top and bottom by counteracting buoyancy forces which might tend to bend or lift the tube.

A depth transducer, in the form of an ultrasonic transducer 8, is located in the top of the tubular member 6, and both directs sonic signals towards the bottom of the tubular member 6 and receives reflected signals or echoes from within the tubular member. An example of a suitable system utilizing pulse-echo ranging in a container to measure content levels is found in U.S. Pat. No. 4,596,144, the system comprising the transducer 8 and a control unit 32.

A float 10 is located in the tank. As shown in FIG. 2, in a preferred construction of the float, a styrofoam core 11 is surrounded by fluid impermeable glass fibre covering 12.

Figure 3:
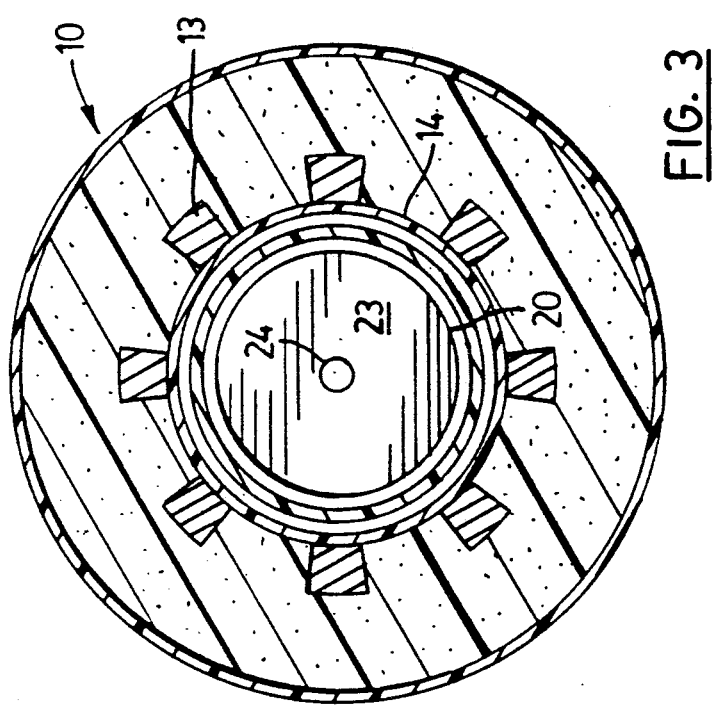
FIG. 3 is a top sectional view of one embodiment of the float.

As shown in FIG. 3, the float 10 may in one embodiment be annular with a number of magnets 13 disposed around its inner circumference 14, oriented as shown diagrammatically in FIG. 4 so as to generate a peripheral polarized magnetic field within the tubular member 6. Alternatively, a single annular ceramic magnet may be used.

A marker 20 is located inside the sealed tubular member 6, which marker, for lightness, may be constructed of polyvinyl chloride. The term marker is used as an allusion to the characteristics it exhibits as a levitated marker within the tubular member 6, as described below.

The marker 20 is provided with an annular magnet 21 located at its perimeter, oriented, as shown in FIG. 4, so as to generate within the tubular member 6 a concentric peripheral polarized magnetic field of like polarity and immediately above and surrounding the magnetic field generated by the magnets 13 in the float 10.

As clearly demonstrated in the schematic drawing of FIG. 4, the adjacent magnetic fields generated by the float 10 and the marker 20 are of like polarity, and therefore repel one another. The repulsion exerted by the concentric magnetic fields of the magnets 13 and 21 of the annular float 10 and the marker 20, respectively, thus cause the marker to achieve a relatively central equilibrium in the tubular member 6 stabilised just above the plane of the magnetic field of the float magnets 13, without drag through contact with the walls of the tubular member 6. The marker 20 will thus rise or fall freely in the tubular member 6 following the level of the float 10 floating on the contents 2 of the tank 1.

In FIG. 5, a preferred embodiment of the marker is illustrated, comprising, a hollow piston 20a having the magnet 21 forming a ring around the upper perimeter of the piston 20a.

Construction of piston 20a, preferably of PVC, is both light and fairly stable due to the keel-like effect of a depending skirt portion of the piston 20a, which provides a centre of gravity of the piston below its centre of levitation, thus meeting the condition for stable equilibrium.

An annular flange or lip 22 around the upper end of piston 20a centres the piston within the tubular member 6. Preferably, the circumference of lip 22 is only slightly less than the inner circumference of the tubular member 6 so that the piston 20a is a loose sliding fit in the tubular member 6.

Lip 22 also supports a reflection disc 23 spanning the piston 20a. The disc 23 may be of vinyl or any other suitable material to provide an upper reflective surface on the piston 20a facing the transducer 8 and forming a target to reflect sonic signals transmitted from the transducer 8. The lag time between signal transmission and reception of a reflected signal is determined by control unit 32 which calculates the depth of the marker 20 in the tubular member, as described in U.S. Pat. No. 4,596,144.

In one embodiment of the invention, a through aperture 24 in the disc 23 on the piston 20a permits a portion of the sonic signals transmitted from the transducer 8 to pass through the piston 20a and reflect from the bottom of the tubular member 6, while a further portion is reflected from the disc directly. In a further modification, some of the signals, which pass through the aperture 24 in the disc 23 and are reflected at the bottom of the tubular member 6, are again reflected by the bottom surface of the disc 23, and then reflected from the bottom of the tubular member 6 back to the transducer 8.

In these latter embodiments, the control unit 32 identifies the return echoes from the signals received by the transducer of the three groups of signals in order to determine an accurate reading of the depth of marker 20 in the tubular member 6 and indirectly, an accurate fluid level in the tank 1.

I claim:

1. A system for sensing the level of contents in a container, comprising:
   a tubular member having a top and bottom end, vertically disposed in the container and sealed from the contents of the container,
   a depth transducer for transmitting and receiving signals located at one end of the tubular member;
   a levitating marker located in the tubular member in signal reflecting relationship with the depth transducer, whereby the depth transducer senses the depth of the marker in the tubular member, which corresponds to the level of contents in the container, said levitating marker including means to generate a peripheral polarized magnetic field;
   float means surrounding the tubular member and buoyantly supported on the contents in the container, said float means generating, within the tubular member and immediately beneath the field generated by said levitating marker, a peripheral polarized magnetic field of like polarity to and concentric with the magnetic field generated by said marker, thereby levitating said marker; and
   means to maintain said marker in a stable equilibrium within the tubular member.

2. A system, according to claim 1, wherein the depth transducer is located at the top end of the tubular member above said maximum upper content level.

3. A system, according to claim 1, wherein the depth transducer is adapted to emit ultrasonic signals into the tubular member and to receive return echo signals, and wherein the marker comprises a target facing said depth transducer, the target having a first reflective surface facing the depth transducer, whereby to echo at least a first portion of the signals back to the depth transducer.

4. A system, according to claim 3, wherein the target has defined therethrough an aperture permitting passage of a second portion of the signals from the depth transducer to an opposite end of the tubular member, said opposite end of the tubular member being adapted to directly echo at least some of said second portion of the signal through the aperture in the target and back to the depth transducer.

5. A system, according to claim 4, wherein the target further comprises a second reflective surface facing the opposite end of the tubular member, whereby some of said second group of signals will echo between said opposite end of the tubular member and the second reflective surface of the target before returning from the opposite and of the tubular member through the aperture in the target and back to the depth transducer.

6. A system, according to claim 3, wherein the marker comprises a hollow piston extending coaxially within the tubular member and having a piston head at its upper end and the target comprises a disc of reflective material on the piston head.

7. A system, according to claim 3, wherein the depth transducer forms part of a pulse-echo ranging system which calculates ranges on the basis of the time lag between emission of a signal by the depth transducer and receipt of at least one return echo signal by the transducer.

8. A system, according to claim 1, wherein the bottom end of the tubular member is secured to a bottom wall of the container.

9. A system, according to claim 1, wherein the bottom end of the tubular member is weighted to counteract buoyant forces applied to it by the contents of the container.

10. A system, according to claim 1, further comprising content egress means located in the container above the bottom of the tubular member.

11. A system, according to claim 1, wherein the float means comprise an annulus of buoyant material surrounding the tubular member, the annulus having at least one magnet affixed to its inner circumference to exert a peripheral polarized magnetic force into the tubular means.

12. A system, according to claim 11, wherein said at least one magnet comprises an array of magnets disposed around the inner circumference of the annulus.

13. A system, according to claim 11, wherein said at least one magnet is an annular magnet.

14. A system, according to claim 11, wherein the annulus is composed of a styrofoam core surrounded by a fluid impermeable coating.

15. A system, according to claim 1, wherein the marker comprises a hollow piston extending coaxially within the tubular member and having a piston head at its upper end.

16. A system, according to claim 15, wherein the piston head is provided with an annular magnet providing the peripheral polarized magnetic field.

17. A system according to claim 15, wherein the piston is provided with an upper annular lip providing loose sliding fit of the piston in the tubular member whereby to substantially centre the piston in the tubular member.

18. A system, according to claim 15, wherein the piston further comprises a depending skirt portion forming the means to maintain stable equilibrium of the marker.

* * * * *